United States Patent [19]

Mogi et al.

[11] Patent Number: 4,471,377

[45] Date of Patent: Sep. 11, 1984

[54] COLOR INFORMATION DISPLAY APPARATUS

[75] Inventors: Takao Mogi, Tokyo; Satoru Maeda, Yamato, both of Japan

[73] Assignee: Sony Corporation, Tokyo, Japan

[21] Appl. No.: 519,222

[22] Filed: Aug. 3, 1983

Related U.S. Application Data

[63] Continuation of Ser. No. 311,186, Oct. 14, 1981.

[30] Foreign Application Priority Data

Oct. 16, 1980 [JP] Japan ............................ 55-144721

[51] Int. Cl.[3] ............................ H04N 9/535

[52] U.S. Cl. ............................ 358/22; 358/183

[58] Field of Search ............................ 358/22, 183, 56

[56] References Cited

U.S. PATENT DOCUMENTS 4,266,242 5/1981 McCoy ............................ 358/183

*Primary Examiner*—Richard Murray

*Attorney, Agent, or Firm*—Lewis H. Eslinger; Alvin Sinderbrand

[57] ABSTRACT

A color information display apparatus includes a common memory of an integrated circuit configuration for storing both pattern data and color data describing an attribute of the corresponding pattern data to be displayed on a CRT, the common memory including a first address area for the pattern data and a second, different address area for the color data, a circuit for generating address signals for the common memories in response to the scanning position of the electron beam on the screen of the CRT, a parallel-serial converting circuit for converting parallel pattern data in the common memory to serial data, a first latch circuit for latching the color data in the common memory to produce an output color signal, a circuit for generating a color information signal from the serial data from the parallel-serial converting circuit and the output signal from the first latch circuit, an address selector connected between the address signal generating circuit and the common memory, the first address area and the second address area of the common memory being addressed alternatively by the address selector, and a second latch circuit connected between the common memory and the serial-parallel converting circuit for latching the pattern data supplied to the latter circuit.

14 Claims, 26 Drawing Figures

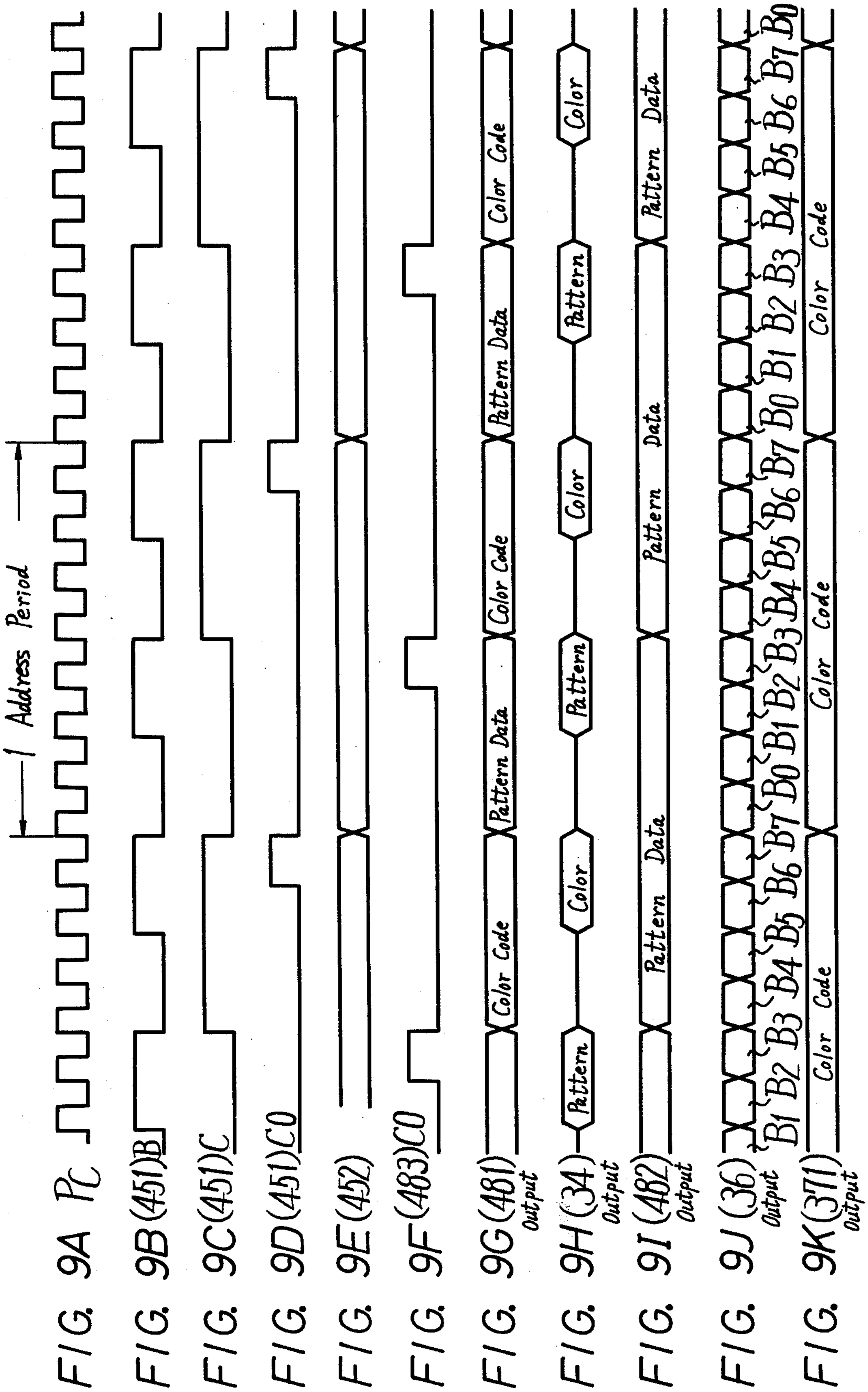
1 Address Period
FIG. 9A Pc
FIG. 9B (451) B
FIG. 9C (451) C
FIG. 9D (451) C0
FIG. 9E (452)
FIG. 9F (483) C0
FIG. 9G (481) Output
Color Code
Pattern Data
FIG. 9H (34) Output
Pattern
Color
FIG. 9I (482) Output
Pattern Data
FIG. 9J (36) Output
B1 B2 B3 B4 B5 B6 B7 B0
FIG. 9K (371) Output
Color Code

COLOR INFORMATION DISPLAY APPARATUS

This is a continuation of application Ser. No. 06/311,186 filed Oct. 14, 1981.

BACKGROUND OF THE INVENTION

1. Field of the Invention

The present invention relates generally to a color information display apparatus for use with a receiving apparatus for a character broadcast such as a teletext or the like, and is directed more particularly to a read-out circuit for a display memory.

2. Description of the Prior Art

It has been proposed to use a character multiplexed television broadcast in which various information, such as news, weather forecast, reports and the like, are broadcast by utilizing the vertical blanking period of the television broadcast.

For the character broadcast, there exists a code transmission system, pattern transmission system or combination of these two systems. As an example, the pattern transmission system will now be explained with reference to FIGS. 1 to 3, each of which shows an information format for such system.

In this example, as shown in FIG. 1, picture elements of 248 dots form one horizontal line, 204 horizontal lines thereof form one page, and one page forms the picture on the screen. In this case, however, one picture element takes a binary value of "1" or "0", and the picture elements of 8 dots×12 dots (lines) are designated as one sub-block. Thus, one page consists of 31×17 sub-blocks, and color is indicated for each sub-block unit. Further, the number of pages is selected to be, for example, about 100 pages, and the data of 100 pages is repeatedly broadcast.

As shown in FIG. 2A, the data signal is broadcast as a serial digital signal within the 20th horizontal period (during an odd field period) and the 283rd horizontal period (during an even field period) of the vertical blanking period, and as to any desired page each page of the data signal is broadcast as follows:

As shown in FIG. 3, a page control packet PP is broadcast or fed within the first field period. As shown in FIG. 2B, this packet PP comprises, in the header region of 48 bits of the horizontal period, a clock signal CK, a framing code signal FC showing the start position of the following signal and other control signals, and also in the data area of 248 bits of the horizontal period a page control signal which shows to which page the data signal belongs and the like.

Within the second field period, a line control packet LP is fed. As shown in FIG. 2C, this line control packet LP comprises, in the data area, a line code LC showing at which lines of the sub-blocks the following 12 packets are located and color codes for indicating the colors of the respective sub-blocks for each sub-block unit. The color codes consist of 4 bits for each sub-block and each designates the color thereof.

Further, during the 3rd to 14th field periods, 12 pattern data packets DP are sequentially fed. As shown in FIG. 2D, the packets DP each comprise in one line (31 sub-blocks) the picture elements of the first to 12th lines in the data areas thereof. For example, the first pattern data packet DP fed during the third field period includes the picture elements in the first line in the respective sub-blocks, that is, in the first line sequentially in the data area thereof.

Accordingly, all picture elements and the color information thereof in the sub-blocks in the first line of one page are completed by the packets fed from the second field period to the 14th field period.

Similar to the above, the sub-blocks of any one line are fed by the packet LP of one line and 12 following pattern data packets DP.

Thus, when the picture elements of the 12th line of the 17th sub-block (in the vertical direction) are fed during the 222nd field period by the packet DP, the data of one page has been fed. During the field periods following the 223rd field period, the data of other pages are again fed starting from the page control packet PP sequentially. Accordingly, the data of one page is fed by one page control packet PP, 17 line control packets LP and 204 (17×12) pattern data packets DP. In this case, 204 pattern data packets DP correspond to the picture elements of FIG. 1.

A prior art receiver for character broadcast with the above format is constructed as shown in, for example, FIG. 4.

In FIG. 4, a video signal system 10 includes a tuner 11, a VIF (video intermediate frequency) amplifier 12 and a video detecting circuit 13. Upon receiving an ordinary or conventional broadcast, the composite color video signal from video detecting circuit 13 is fed to a color signal reproducing circuit 14 from which three primary color signals R, G and B are derived. These three primary color signals R, G and B are supplied through a switching circuit 15 to a color cathode ray tube 16 to be reproduced as a color image on a display screen thereof.

In FIG. 4, a reproducing system 20 for the character broadcast which uses a microcomputer is provided. In particular, system 20 includes a CPU central processing unit) 21 which, for example, processes 8-bit parallel data, a ROM (read only memory) 22 in which the program for receiving the character broadcast is written and a RAM (random access memory) 23 for the work area. The above elements are connected through a data bus 24 and an address bus 25, which are, in turn, connected to an interface 26.

Further, in FIG. 4, a buffer memory 33 having a storage capacity for one packet, and display memories 34 and 35 each having a storage capacity for one page are provided. In this case, memory 34 is a pattern memory for storing the pattern data and memory 35 is a color memory for storing the color code information. A key board 41 and a timing signal generating circuit 42 are also provided. The key board 41 comprises a key (switch) for changing over between the normal broadcast receiving mode and the character broadcast receiving mode, a key for selecting desired pages and so on. The output from key board 41 is fed to interface 26 and also to timing signal generating circuit 42. Timing signal generating circuit 42 is formed of a synchronous separating circuit, a PLL (phase locked loop), a logic circuit and the like, and is supplied with the video signal from video detecting circuit 13 to generate various signals synchronized with the video synchronizing pulses and clock signal CK, for example, a clock pulse synchronized with clock signal CK and with a frequency of $\frac{1}{8}$ (one-eighth) of the frequency thereof, and so on. A flag signal showing the vertical scanning period and the vertical fly-back period is supplied from generating circuit 42 to CPU 21 which, in turn, supplies flag signals representing the completion of various processes to generating circuit 42.

Further, address counters 43, 44 and 45 are provided. Address counter 43 serves as a write address counter which will designate the address of memory 33 during the write-in mode and is supplied with the clock pulse from generating circuit 42 as a count input and also with a clear pulse synchronized with the horizontal synchronizing pulse, so that the count value of counter 43 is incremented one count during the header and data periods of the packet, for every 8 bits of the header and data information. Further, counters 44 and 45 are respectively read address counters which will designate the address of memories 34 and 35 during the read-out mode, respectively. The read address counter 44 is supplied with the horizontal synchronizing pulse from generating circuit 42 as a count input and also with a clear pulse synchronized with the vertical synchronizing pulse, so that the count value of counter 44 is incremented by one for every horizontal period starting from the horizontal period when the most significant line of the character of the character broadcast is displayed. Further, read address memory 45 is supplied with the clock pulse from generating circuit 42 as a count input and also with a clear pulse synchronized with the horizontal synchronizing pulse, so that the count value of counter 45 is incremented by one for at every bit of the clock pulse starting from the time when the dot at the left end of the character of the character broadcast is displayed.

The video signal from video detecting circuit 13 is also supplied to a shift register 31 of the serial input-parallel output type in which the packet is converted from a serial signal to a parallel signal for every 8 bits and then supplied to a gate circuit (3-state buffer) 32. The counter 44 produces a pulse $P_{44}$ which is at logic level "1" during the horizontal period (horizontal period of the 20th or 283rd lines) within which the packet is fed, and this pulse $P_{44}$ is supplied to gate circuit 32 as a control signal. Thus, the packet signal is delivered as an 8 bit in parallel signal to data bus 24.

At this time, pulse $P_{44}$ is also supplied to CPU 21 as a hold signal, so that CPU 21 is operated in a holding state during the horizontal feed period of the packet. The pulse $P_{44}$ is further applied to a change-over gate 46 as a control signal, whereby the output from counter 43 is supplied through change-over gate 46 to memory 33 as an address signal. Accordingly, the packet signal is transferred as an 8 bit in parallel signal from register 31 through data bus 24, but not through CPU 21, to memory 33 by DMA (direct memory addressing). At this time, since the address of memory 33 is incremented one address counter 43 for every 8 clock pulses, the packet signal is written in memory 33 for every 8 bits.

After the horizontal period of the packet is completed, pulse $P_{44}$ is at logic level "0" ($P_{44}$="0") and register 31 is disconnected from data bus 24 by gate 32 which is then in its opened position. At this time, the holding state of CPU 21 is released, while address bus 25 is connected to memory 33 through change-over gate 46.

Consequently, data from memory 33 is processed by CPU 21 in accordance with the program stored in ROM 22 and it is determined whether the data is data of a desired page input by key board 41 or not from the received page control signal. When it is not that of the desired page, the data is neglected.

The above operation is repeated at every field until the packet PP of the desired page is received.

When the data from memory 33 is the packet PP of the desired page, the following operation will be carried out. Although the packets fed during the successive 221 field periods are desired or necessary packets, when the packet LP following the packet PP is fed, the packet LP is written in memory 33 by DMA. After the packet LP has been completely written thereinto and the holding state of CPU 21 is released, the data from memory 33 is processed by CPU 21 and the color code information is read out from memory 33. This color code information is then written in memory 35 through data bus 24, and is carried out during the same vertical fly-back period. The address bus 25 is connected to memory 35 through a change-over gate 47, which is supplied with the control signal from generating circuit 42, while the address of memory 35 is designated by CPU 21.

Further, when the next packet DP is fed following the packet LP, the packet DP is also written in memory 33 through DMA. Then, by processing by CPU 21, only the pattern data is transferred from memory 33 to memory 34 during the vertical fly-back period. The address of memory 34 is also designated by CPU 21.

When the packets LP and DP of the desired page are fed as set forth above, they are stored once in memory 33 by DMA. Then, necessary data is transferred therefrom to memories 34 and 35 by CPU 21 and written therein.

After the data of the last packet DP of the desired page is transferred to memory 34, CPU 21 returns to the waiting state to await a desired page again.

During the vertical scanning period, a control signal is supplied from generating circuit 42 to change-over gate 47 and the outputs from counters 44 and 45 are supplied through change-over gate 47 to memories 34 and 35 as the address signals for read-out. Then, the address in the vertical direction is designated by the output of counter 44 and the address in the horizontal direction is designated by the output of counter 45, so that the color code information and the pattern data stored in memories 34 and 35 are read out simultaneously.

The pattern data read out from memory 34 is supplied to a shift register 36 of the parallel input to serial output type to be converted from a parallel signal to a serial signal. This serial signal is, in turn, supplied to a color generator 37 to which the color code information read out from memory 35 is also supplied, so that data of three primary color signals R, G and B are applied to switching circuit 15 from color generator 37. At this time, the control signal is supplied from generating circuit 42 to switching circuit 15 so that the latter is connected to color generator 37. Accordingly, the desired page of the character broadcast is displayed on receiver 16, that is, the character broadcast is received by the receiver shown in FIG. 4.

With the above prior art receiver, much of the area (address) in each of memories 34 and 35 is not used, and is therefore entirely useless. This will be explained with reference to FIG. 5 which shows the practical relation of the connection between memories 34 and 35 and address counters 44 and 45 of the prior art embodiment shown in FIG. 4. Since the pattern data are processed as parallel 8 bit data, the pattern memory 34 is made of one 8-bit address, while since the color code information is 4 bits at a time, color memory 35 is made of one 4-bit address, respectively. Counter 44 consists of counters 441 and 442, while counter 45 consists of counters 451, 452 and 453, respectively. Color generator 37 is formed of a latch circuit 371 and a decoder 372.

Timing signal generating circuit 42 produces a clock pulse $P_c$ which is in synchronism with the clock signal CK and has a frequency the same as that of the clock signal CK, as shown in FIG. 6A. This pulse $P_c$ is fed to the octal or 8-bit counter 451 which is also supplied with an enable signal from generating circuit 42 only during the display period to deliver an output C of $2^2$ bits, as shown in FIG. 6B, and a carry output CO, as shown in FIG. 6C. The pulse $P_c$ is also fed to the 31-bit counter 452 which is also supplied with the carry signal CO from counter 451 as an enable signal. Accordingly, the count value of counter 452 is incremented by one only during the pattern display period for every 8 bits of the pulse $P_c$, as shown in FIG. 6D.

Outputs A, B, C, D and E from counter 452 are supplied to memory 34 as its lower addresses $A_0$, $A_1$, $A_2$, $A_3$ and $A_4$. Accordingly, the lower addresses $A_0$ to $A_4$ of memory 34 are incremented by one during the pattern display period for every 8 bits of the pulse $P_c$, as shown in FIG. 6D. In other words, the lower addresses $A_0$ to $A_4$ of memory 34 are varied periodically at the horizontal period in correspondence with the horizontal scanning of the picture screen (page).

Further, generating circuit 42 produces a pulse $P_h$ which is synchronized with the horizontal synchronizing pulse and has the same frequency therewith, as shown in FIG. 7A, and an enable signal only during the display period. The pulse $P_h$ and the enable signal are supplied to 204-bit counter 453 whose count outputs A . . . H are applied to memory 34 at its higher addresses $A_5$, $A_6$, . . . $A_{12}$. Accordingly, the count value of counter 453 is incremented by one for every pulse $P_h$ during the pattern display period, as shown in FIG. 7B. Therefore, the higher addresses $A_5$ to $A_{12}$ of memory 34 are incremented by one in correspondence therewith, that is, the higher addresses $A_5$ to $A_{12}$ of memory 34 are periodically varied in response to the vertical scanning of the picture screen at the vertical period.

The output C of counter 451 is supplied to pattern memory 34 as a chip select signal CS so that the data of the address corresponding to the scanning position of the picture screen is read out from memory 34. The outputs $D_0$, $D_1$, . . . $D_7$ of memory 34 are fed to shift register 36 which is also supplied with the carry output CO from counter 451 as a load signal L and with the clock pulse $P_c$ from generating circuit 42. Thus, register 36 generates in series the pattern data in correspondence with the scanning position of the picture screen.

The outputs A to E of counter 452 are also supplied to memory 35 as its lower addresses $A_0$, $A_1$, . . . $A_4$. The pulse $P_h$ is also supplied to 17-bit counter 442 and to 12-bit counter 441, whose carry output CO is applied to the former as an enable signal. Outputs A, B, . . . E of counter 442 are applied to memory 35 at its higher addresses $A_5$ to $A_9$. The output C from the counter 451 is supplied to memory 35 as a chip select signal CS.

Thus, the count value of counter 442 is varied in correspondence with the horizontal scanning of the picture screen and is also varied every 12 horizontal periods, so that the address of memory 35 is varied at every sub-block in correspondence with the scanning of the picture screen and the color code information of each sub-block at the address is read out from memory 35.

The outputs $D_0$ to $D_3$ of memory 35 are applied to latch circuit 371 which is also supplied with the carry output CO of counter 451 as the latch signal therefor and with the clock pulse $P_c$ from generating circuit 42. Thus, from latch circuit 371 derived are the 4-bit color codes corresponding to the sub-block at the scanning position of the picture screen.

The pattern data from shift register 36 and the color code information from latch circuit 371 are supplied to decoder 372 from which three primary color signals R, G and B are derived.

In the above case, since the number of picture elements in one page is 284×204 dots and one dot is represented by one bit, memory 34 requires the following capacity:

$$248\times 204=50592 \text{ (bits)}$$

Further, since the color information is designated for each sub-block unit and each color code is represented by 4 bits, memory 35 requires the following capacity:

$$31\times 17\times 4=2108 \text{ (bits)}$$

However, memories with the above capacities are not conventionally sold memories. Therefore, for memory 34, a memory with the following capacity is used:

$$65536 \text{ bits}=8 \text{ K bytes}$$

and as for memory 35, a memory with the following capacity is used:

$$4096 \text{ bits}=4\times 1 \text{ K bits}$$

Accordingly, in memory 34, the following area (address) capacity is not used:

$$(65536-50592/65536)\times 100\cong 23 \ (\%)$$

and in memory 35, the following area (address) capacity is not used:

$$(4096-2108/4096)\times 100\cong 49 \ (\%)$$

so that there is much unused and wasted area.

As set forth above, although memories 34 and 35 have each a large capacity, much of the areas thereof are not actually used. Thus, the apparatus becomes expensive and the space factor therefore becomes poor.

OBJECTS AND SUMMARY OF THE INVENTION

Accordingly, it is an object of the present invention to provide a color information display apparatus that avoids the above difficulties encountered in the prior art.

It is another object of the invention to provide a color information display apparatus in which color code information is written in an area of a pattern memory which is not used, and during the read out operation, the pattern data and color code information are read out in a time sharing manner and then sequenced in time to provide three primary color signals.

According to an aspect of the present invention, a color information display apparatus comprises:

common memory means for storing both pattern and color data to be displayed on a display screen of display means, the common memory means including a first address area for the pattern data and a second, different address area for the color data;

means for generating address signals for the common memory means in response to a scanning position with respect to the display screen;

parallel-serial converting means for converting parallel pattern data in the common memory means to serial data;

first means for latching the color data in the common memory means to produce an output signal;

means for generating a color information signal from the serial data from the parallel-serial converting means and the output signal from the color data latching means and for supplying the color information signal to the display means; and address selector means connected between the address signal generating means and the common memory means for alternately addressing the first address area and the second address area of said common memory means.

The above, and other, objects, features and advantages of the present invention will become apparent from the following detailed description of an illustrative embodiment of the invention which is to be read in connection with the accompanying drawings.

BRIEF DESCRIPTION OF THE DRAWINGS

FIGS. 1, 2A–2D, 3 are respectively signal formats used for the pattern transmission system of a character broadcast;

FIGS. 9A–9K are waveform diagrams used to explain the operation of the invention shown in FIG. 8.

DETAILED DESCRIPTION OF A PREFERRED EMBODIMENT

Figure 5:
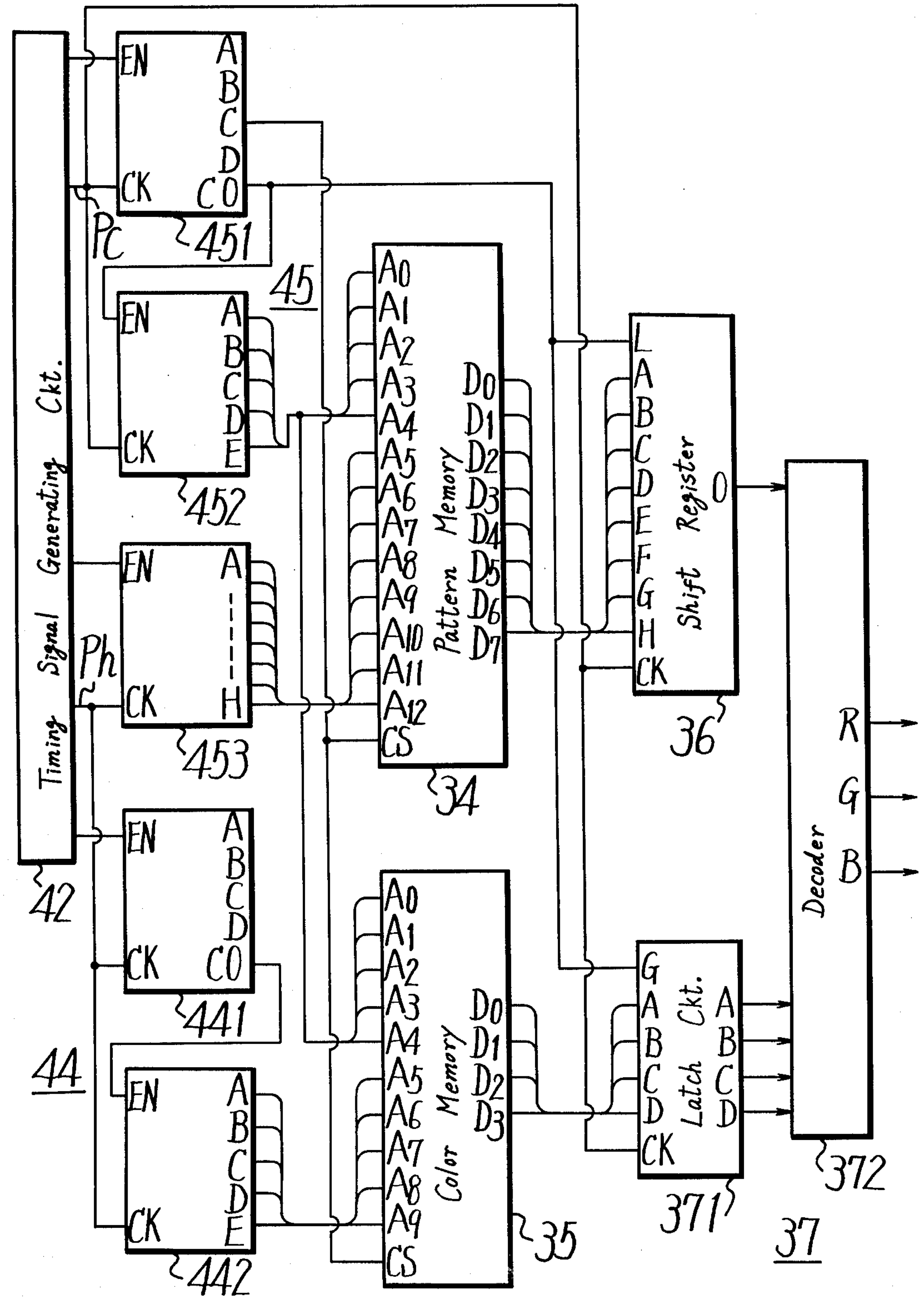
F I G. 5 (PRIOR ART)
FIG. 5 is a block diagram showing a practical embodiment of the memories and counters shown in FIG. 4 for use during the reading-out mode.
Figures 6A, 6B, 6C, 6D, 7A, 7B:
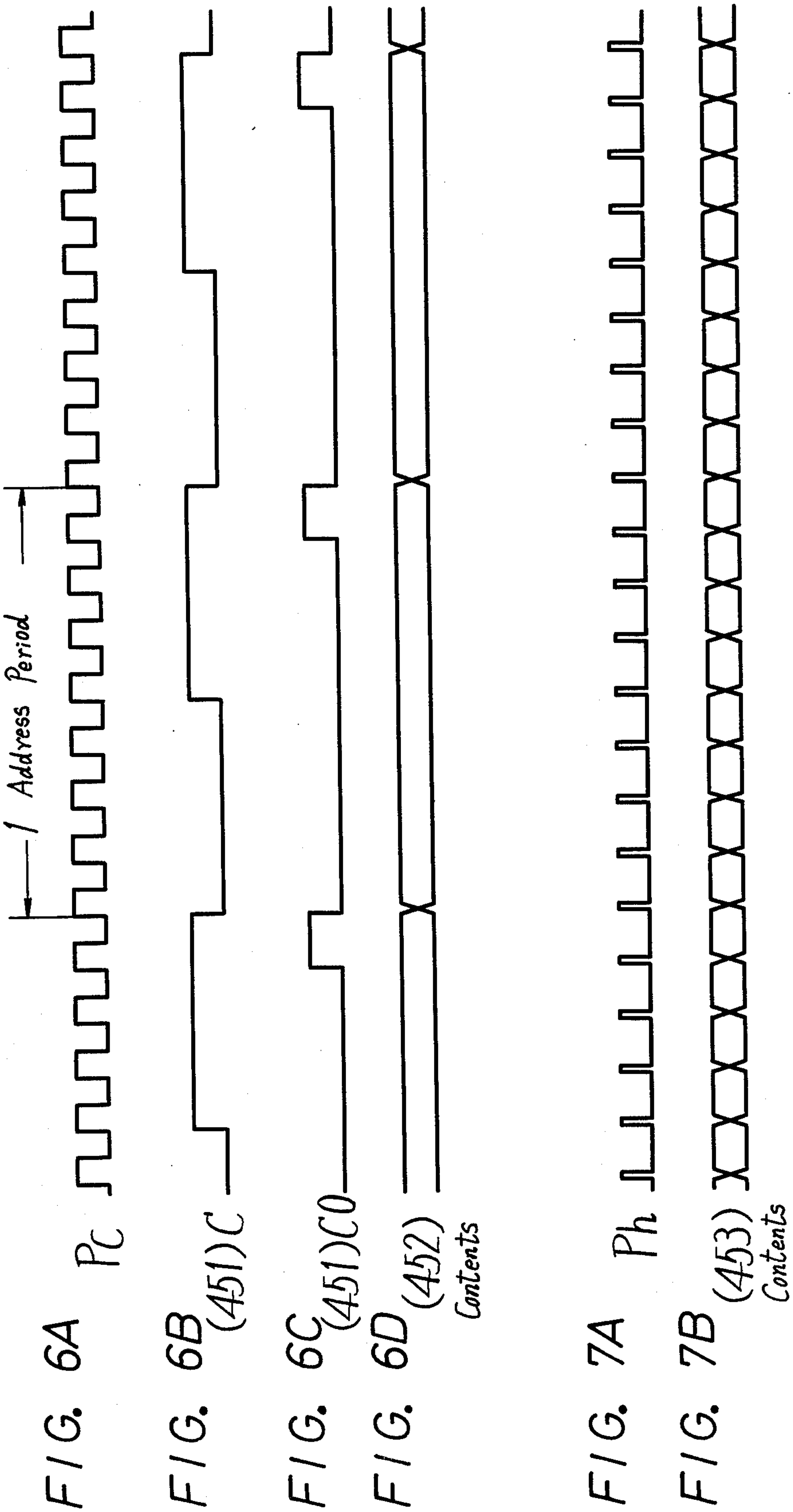
FIGS. 6A–6D and 7A and B are respectively waveform diagrams used to explain the operation of the circuit shown in FIG. 5.
Figure 8:
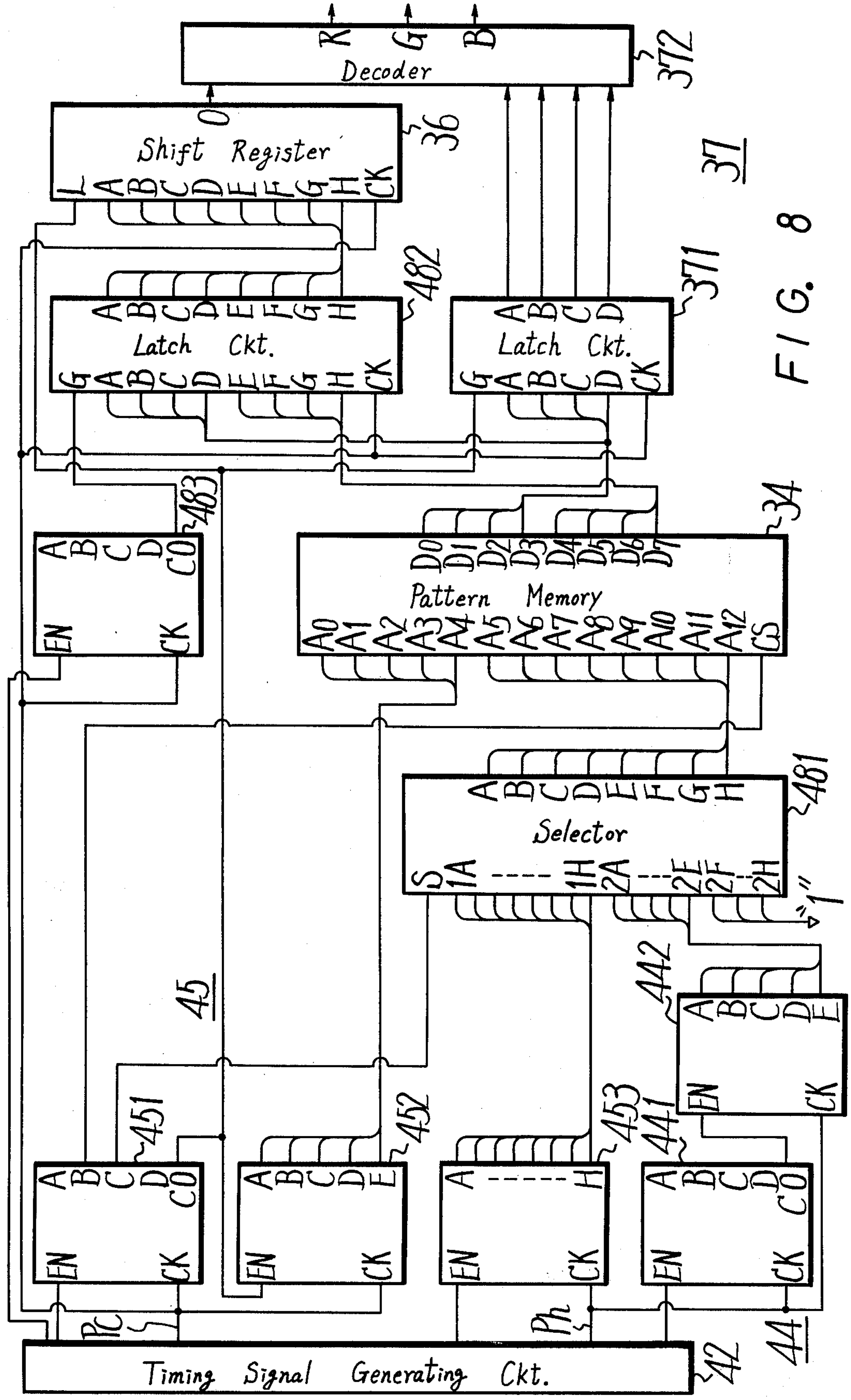
FIG. 8 is a systematic block diagram showing the essential part of a color information display apparatus according to one embodiment of this invention.

Referring now to FIG. 8, a color information display apparatus according to one embodiment of the present invention now described in which the construction of only the essential parts of the invention used during the reading-out mode are shown and in which reference numerals which are the same as those used in FIG. 5 designate the same elements.

Figure 1:
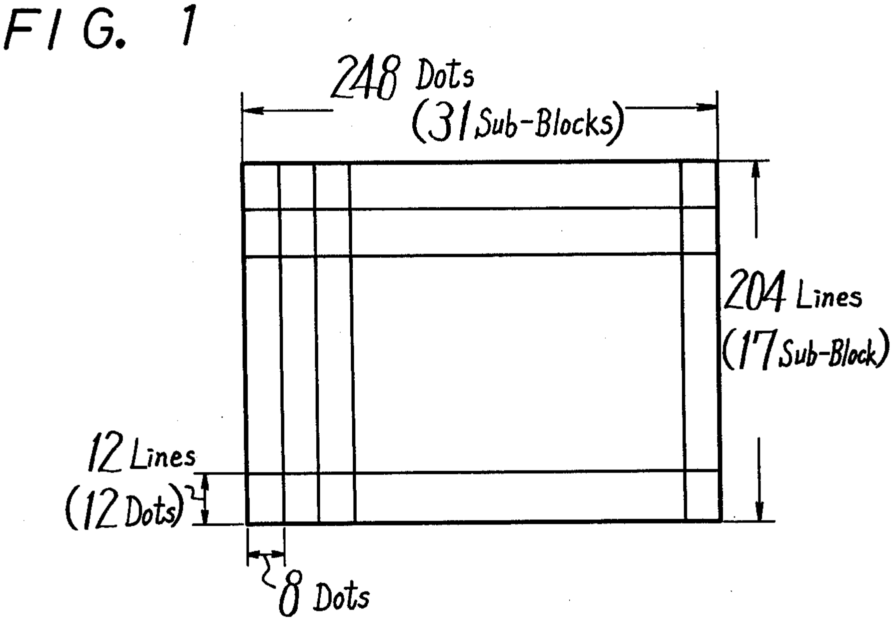
Figure 2A:
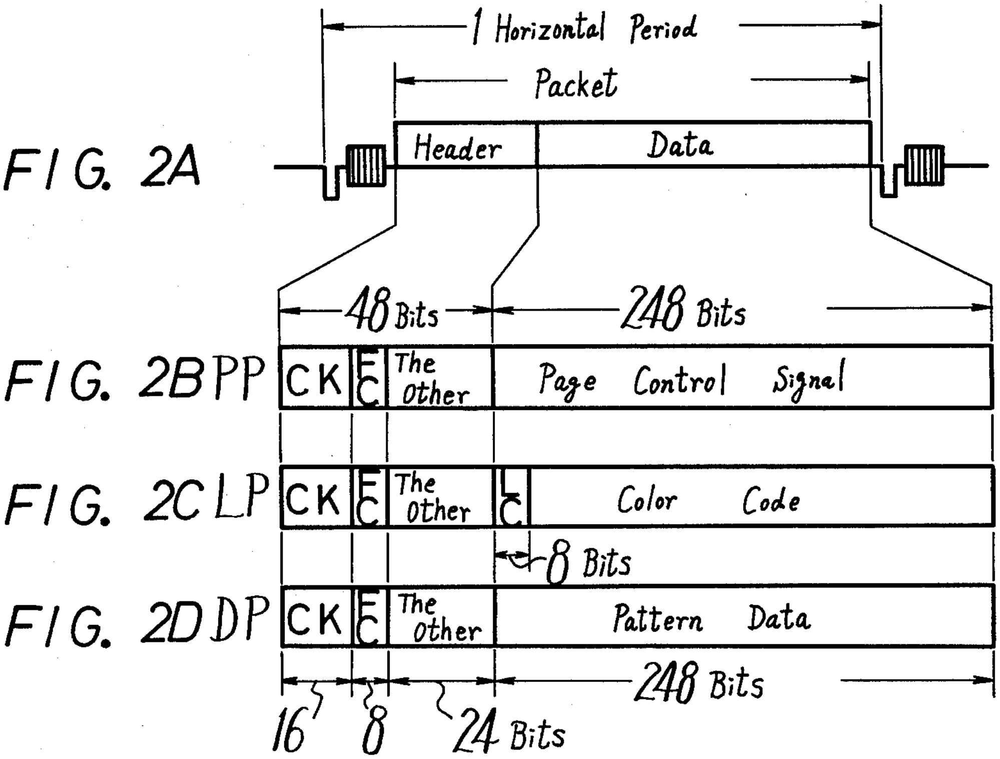
Figure 3:
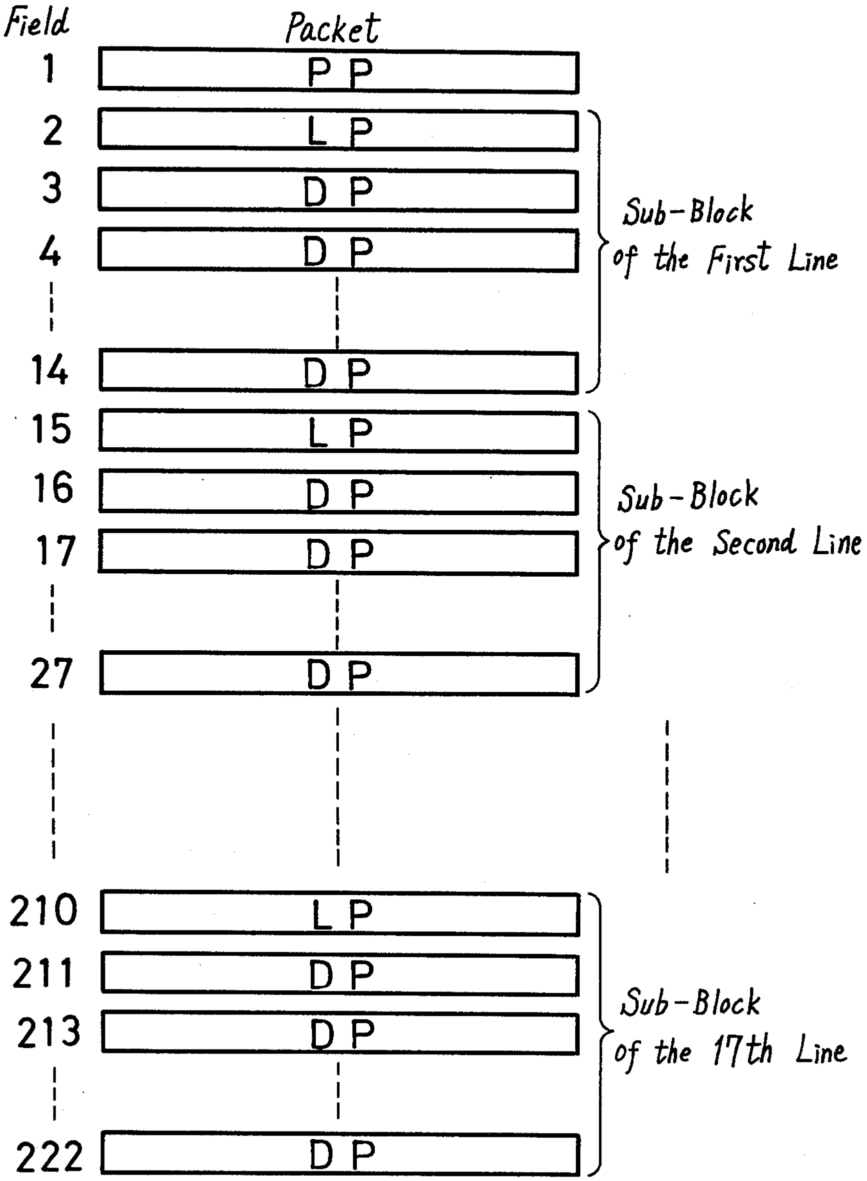
Figure 4:
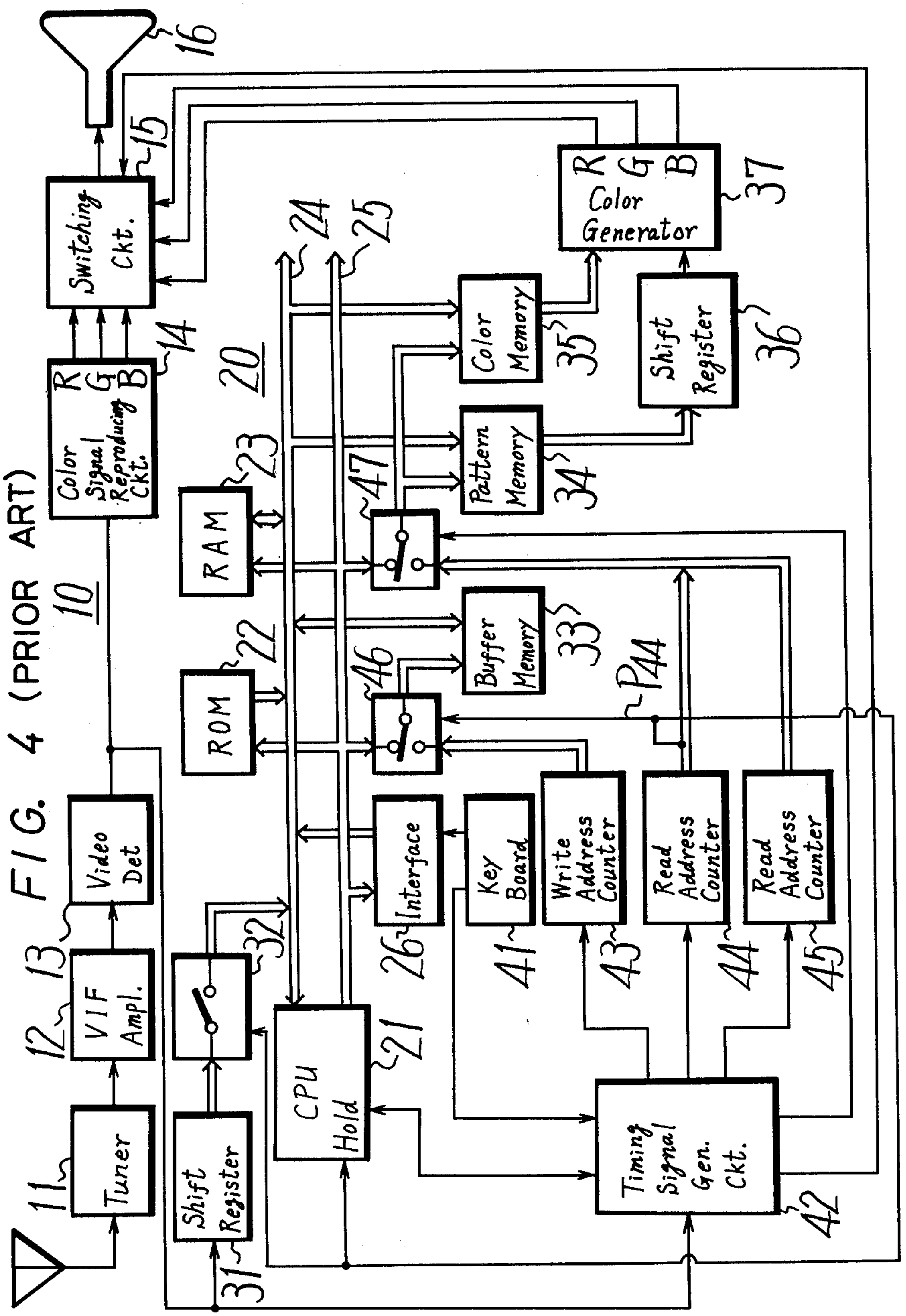
FIG. 4 (PRIOR ART)
FIG. 4 is a block diagram showing a prior art television receiver that can be used for character broadcast with the formats shown in FIGS. 1 to 3.

In the embodiment of the invention shown in FIG. 8, memory 34 is made of 8-bit memory which has a capacity of 8 K bytes, and in which its 0000 H to 1 BFFH addresses are used as the area for the pattern data, its 1 COOH to 1FFFH addresses are used as the area for the color code information, and one color code is provided for each address. Further, the writing of the pattern data and color code information into memory 34 is carried out by CPU 21 (not shown in FIG. 8) in a similar manner to that previously explained in connection with FIG. 4. It is to be appreciated that the character H at the end of each above address shows that the display of the address is in Hexadecimal notation.

In the embodiment of the invention shown in FIG. 8, in addition to the elements shown in the prior art construction of FIG. 5, a selector 481, a latch circuit 482 and an octal counter (8-bit counter) 483 are provided. In this case, selector 481 is used to select the pattern data address and the color code address of memory 34. To this end, selector 481 is supplied with the outputs A to H of counter 453 at inputs 1A to 1H thereof for one channel and with the outputs A to E of counter 442 at inputs 2A to 2E thereof (chosen from inputs 2A to 2H) for the other channel. In this case, since the address of the color code information starts from the 1 COOH address, the inputs 2F to 2H of selector 481 are each supplied with a logic level "1" signal. Also, the output C of counter 451 is applied to selector 481 as a channel select signals, so that selector 481 selects the inputs 1A to 1H when the ouput C of counter 451 is at logic level "0" and selects the inputs 2A to 2H when the output C is at logic level "1".

The outputs A to H of selector 481 are supplied to memory 34 at its higher addresses $A_5$ to $A_{12}$ memory 34 also being supplied with the output B of $2^2$ bits from counter 451 as a chip select signal CS. Therefore, since the output C of counter 451 is inverted at every 4 bits of clock pulse $P_c$, as shown in FIGS. 9A and 9C (FIGS. 9A and 9C to 9E are substantially the same as FIGS. 6A to 6D), from selector 481 are derived the higher addresses (outputs of counter 453) for the pattern data during the former or low-level 4-bit period of one address period and the higher addresses (outputs of counter 442 and the 3-bit logic level "1" signal) for the color code information during the latter or high-level 4-bit period, as shown in FIG. 9G. Then, the higher addresses $A_5$ to $A_{12}$ of memory 34 are designated by the output of selector 481, so that the pattern data and color code information in correspondence with the scanning position at the picture screen are derived in a time sharing manner from memory 34, as shown in FIG. 9H.

In other words, during the period within which the outputs of counter 453 are supplied through selector 481 to memory 34 at the higher addresses $A_5$ to $A_{12}$, the operation is the same as that of FIG. 5, so that from memory 34 derived are the pattern data. However, during the period within which the outputs of counter 442 are supplied through selector 481 to memory 34 at the higher addresses $A_5$ to $A_{12}$ thereof, the higher 3 bits $A_{12}$ to $A_{10}$ are each at logic level "1" and the remaining bits $A_9$ to $A_5$ become the outputs of counter 442. Since $A_{12}$ to $A_{10}$="1" and $A_9$ to $A_0$="0" correspond to the address 1 COOH, after the address 1 COOH, the data, that is, the color code information designated by counter 442, are derived.

Since the color code information is 4-bit information, the higher 4 bits $D_4$ to $D_7$ derived from memory 34 are unnecessary (invalid).

The outputs $D_0$ to $D_7$ of memory 34 are fed to latch circuit 482. The clock pulse $P_c$ is applied to 8-bit counter 483 from generating circuit 42, so that from counter 483 a carry output CO is derived which is shifted by the 4-bit period from the carry output CO of counter 451, as shown in FIGS. 9D and 9F. The carry output CO of counter 483 is applied to latch circuit 482 as a latch pulse which is supplied also with clock pulse $P_c$ from generating circuit 42. Accordingly, as shown in FIG. 9I, only the pattern data in the pattern data and the color code information derived from memory 34 are latched by latch circuit 482 at the falling or negative-going edge of the carry output CO from counter 483.

The latched pattern data is then loaded to shift register 36 at the falling or negative-going edge of the carry output CO of counter 451, so that from register 36 are derived pattern data in series at every clock pulse $P_c$, as shown in FIG. 9J.

The outputs $D_0$ to $D_3$ of memory 34 are supplied to latch circuit 371 which is also supplied with the carry output CO of counter 451, so that the outputs $D_0$ to $D_3$ are latched by latch circuit 371 at the falling or negative-going edge of the carry output CO of counter 451, and hence, the color code information, in correspondence with the pattern data, is derived from latch circuit 371, as shown in FIG. 9K.

As described above, according to the color information display apparatus of the present invention, the unused area of pattern data memory 34 is used for storing the color code information, so that the color code memory used in the prior art apparatus becomes unnecessary, and hence, the apparatus can be made inexpensive.

In particular, according to the present invention, the circuit around memory 34 can be made as an LSI (large scale integrated) circuit, so that even if circuits 481 to 483 are newly added, the apparatus can be inexpensively made and the space factor thereof can be improved.

The above description has been given for the case where the display apparatus of the invention is applied to the receiving system for a character broadcast, but the present invention can be applied to a display apparatus of a so-called personal computer.

Further, in the above embodiment of the invention, it is explained that the invention is applied to a pattern transmission system wherein the pattern is directly transmitted, but it is of course possible to apply the invention to a code transmission system wherein characters and the like are transmitted as codes, with the same effect.

Having described a specific preferred embodiment of the invention with reference to the accompanying drawings, it is to be understood that the present invention is not limited to that precise embodiment and that various changes and modifications can be effected therein by one skilled in the art without departing from the scope or spirit of the invention as defined in the appended claims herein.

We claim:

1. A color information display apparatus for displaying color information comprised of pattern data and color data, with one field of said pattern data and color data being transmitted with a television signal over a plurality of field intervals of said television signal, said apparatus comprising:

gating means for gating only said color information during transmission of said television signal;

a single memory of an integrated circuit configuration for storing both of said pattern and color data to be displayed on a display screen of display means, said single memory including N successive storage locations with a first area of a first successive plurality of said N successive storage locations being provided for storing said pattern data and a second, different area of a second, different successive plurality of said N successive storage locations being provided for storing said color data;

address signal generating means for generating address signals for said single memory in response to a scanning position with respect to said display screen;

parallel-serial converting means for converting parallel pattern data in said single memory to serial data;

first means for latching said color data in said single memory to produce an output signal;

means for generating a color information signal from said serial data from said parallel-serial converting means and from said output signal from said first means and for supplying said color information signal to said display means which displays said color information; and address selector means connected between said address signal generating means and said single memory for alternately addressing in a time sharing manner said first area and said second area of said single memory.

2. Apparatus for displaying color information on display means of the type including a display screen scanned by an electron beam, said color information being comprised of pattern data and color data transmitted with a television signal over a plurality of field intervals of said television signal, said apparatus comprising:

gating means for gating only said color information during transmission of said television signal;

a single memory for simultaneously storing both of said pattern data and color data, said single memory including N successive storage locations, and said pattern data being stored in said single memory at a first set of successive storage locations and said color data being stored in said single memory at a second set of successive storage locations which does not overlap with said first set;

address generating means for generating address signals corresponding to storage locations in said first and second sets in response to a scanning position with respect to said display screen;

address selector means for alternately addressing locations in said first and second sets in a time sharing manner in response to said address signals from said address generating means to cause said color data and pattern data to be alternately read out of said single memory; and control means for supplying control signals to said display means in response to said read-out color data and pattern data to cause said display means to display said color information on said display screen.

3. Apparatus according to claim 2; in which said address generating means includes vertical address generating means for generating vertical address signals corresponding to a vertical scanning position with respect to said display screen and horizontal address generating means for generating horizontal address signals corresponding to a horizontal scanning position with respect to said display screen; and said address selector means alternately addresses locations in said first and second sets of said single memory in response to said vertical and horizontal address signals to cause said color data and pattern data to be alternately read out of said single memory.

4. Apparatus according to claim 2; in which said control means includes first latch means for temporarily storing said color data read-out from said single memory, and second latch means for temporarily storing said pattern data read-out from said single memory.

5. Apparatus according to claim 4; in which said color data and pattern data temporarily stored in said first and second latch means, respectively, are stored in parallel form, and further including serial-parallel converting means for converting the parallel pattern data in said second latch means to serial pattern data.

6. Apparatus according to claim 5; in which said display means includes a color cathode ray tube having a display screen scanned by an electron beam, and said control means further includes decoder means for producing three primary color information signals in response to said serial pattern data and said parallel color data and switching means for supplying said three primary color information signals to said display means to modulate said electron beam as the latter scans said display screen.

7. Apparatus according to claim 5; in which said parallel pattern data stored in said second latch means includes 8-bit parallel pattern data and said color data stored in said first latch means includes 4-bit parallel color data.

8. A color information display apparatus for displaying color information comprised of pattern data and color data, said apparatus comprising:

a single memory of an integrated circuit configuration for storing both of said pattern and color data to be displayed on a display screen of display means, said single memory including N successive storage locations with a first area of a first successive plurality of said N successive storage locations being provided for storing said pattern data and a second, different area of a second, different successive plurality of said N successive storage loctions being provided for storing said color data;

address signal generating means for generating address signals for said single memory in response to a scanning position with respect to said display screen;

parallel-serial converting means for converting parallel pattern data in said single memory to serial data;

first means for latching said color data in said single memory to produce an output signal;

means for generating a color information signal from said serial data from said parallel-serial converting means and from said output signal from said first means and for supplying said color information signal to said display means which displays said color information; and address selector means connected between said address signal generating means and said single memory for alternately addressing in a time sharing manner said first area and said second area of said single memory.

9. Apparatus for displaying color information on display means of the type including a display screen scanned by an electron beam, said color information being comprised of pattern data and color data, said apparatus comprising:

a single memory for simultaneously storing both of said pattern data and color data, said single memory including N successive storage locations, and said pattern data being stored in said single memory at a first set of successive storage locations and said color data being stored in said single memory at a second set of successive storage locations which does not overlap with said first set;

address generating means for generating address signals corresponding to storage locations in said first and second sets in response to a scanning position with respect to said display screen;

address selector means for alternately addressing locations in said first and second sets in a time sharing manner in response to said address signals from said address generating means to cause said color data and pattern data to be alternately read out of said single memory; and control means for supplying control signals to said display means in response to said read-out color data and pattern data to cause said display means to display said color information on said display screen.

10. Apparatus according to claim 9; in which said address generating means includes vertical address generating means for generating vertical address signals corresponding to a vertical scanning position with respect to said display screen and horizontal address generating means for generating horizontal address signals corresponding to a horizontal scanning position with respect to said display screen; and said address selector means alternately addresses locations in said first and second sets of said single memory in response to said vertical and horizontal address signals to cause said color data and pattern data to be alternately read out of said single memory.

11. Apparatus according to claim 9; in which said control means includes first latch means for temporarily storing said color data read-out from said single memory, and second latch means for temporarily storing said pattern data read-out from said single memory.

12. Apparatus according to claim 11; in which said color data and pattern data temporarily stored in said first and second latch means, respectively, are stored in parallel form, and further including serial parallel converting means for converting the parallel pattern data in said second latch means to serial pattern data.

13. Apparatus according to claim 12; in which said display means includes a color cathode ray tube having a display screen scanned by an electron beam, and said control means further includes decoder means for producing three primary color information signals in response to said serial pattern data and said parallel color data and switching means for supplying said three primary color information signals to said display means to modulate said electron beam as the latter scans said display screen.

14. Apparatus according to claim 12; in which said parallel pattern data stored in said second latch means includes 8-bit parallel pattern data and said color data stored in said first latch means includes 4-bit parallel color data.

* * * * *